United States Patent
Benkreira et al.

(10) Patent No.: US 11,750,586 B2
(45) Date of Patent: Sep. 5, 2023

(54) TECHNIQUES TO PRE-AUTHENTICATE A USER IDENTITY FOR AN ELECTRONIC ACCOUNT

(71) Applicant: Capital One Services, LLC, McLean, VA (US)

(72) Inventors: Abdelkader M'Hamed Benkreira, Washington, DC (US); Joshua Edwards, Philadelphia, PA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 125 days.

(21) Appl. No.: 17/096,453

(22) Filed: Nov. 12, 2020

(65) Prior Publication Data

US 2021/0067499 A1 Mar. 4, 2021

Related U.S. Application Data

(63) Continuation of application No. 16/515,606, filed on Jul. 18, 2019, now Pat. No. 10,873,571.

(51) Int. Cl.
*H04L 9/40* (2022.01)
*H04L 9/32* (2006.01)
*H04W 12/062* (2021.01)

(52) U.S. Cl.
CPC ........... *H04L 63/08* (2013.01); *H04L 9/32* (2013.01); *H04L 63/0815* (2013.01); *H04L 63/101* (2013.01); *H04L 2463/082* (2013.01); *H04W 12/062* (2021.01)

(58) Field of Classification Search
CPC ........... H04L 63/08–0892; H04L 63/10; H04L 63/108; H04L 29/32; H04L 29/06755–0685
See application file for complete search history.

(56) References Cited

U.S. PATENT DOCUMENTS

| | | | |
|---|---|---|---|
| 10,057,227 B1* | 8/2018 | Hess | G06F 21/31 |
| 2015/0134518 A1* | 5/2015 | Turovsky | G06Q 20/12 705/41 |
| 2017/0078285 A1* | 3/2017 | Lee | H04L 41/0873 |
| 2017/0111370 A1* | 4/2017 | Ng | H04L 63/12 |
| 2017/0126660 A1* | 5/2017 | Brannon | H04L 63/0823 |

* cited by examiner

*Primary Examiner* — Shaqueal D Wade-Wright
(74) *Attorney, Agent, or Firm* — KDW Firm PLLC

(57) ABSTRACT

Techniques to pre-authenticate an identity for an electronic account are described and claimed by the present disclosure. The electronic account may enforce a multi-factor authentication procedure that involves a number of steps. In addition to the electronic account, a user may have other accounts requiring authentications. Successful authentications with respect to those other accounts may provide evidence of the user's identity. If sufficient evidence is present, one or more steps of the multi-factor authentication procedure may be bypassed. Other embodiments are described and claimed.

17 Claims, 8 Drawing Sheets

600

PROCESS A WEB DOCUMENT AND IDENTIFY A PORTION
CORRESPONDING TO A SECURE LOGIN PROTOCOL
*602*

IDENTIFY A SUCCESSFUL LOGIN WITH A WHITE-LISTED
DIGITAL PROPERTY
*604*

PROCESS INFORMATION ASSOCIATED WITH A FIRST-PARTY
DIGITAL PROPERTY
*606*

ISSUE A CONTROL DIRECTIVE TO OMIT A PORTION OF A
MULTI-FACTOR AUTHENTICATION PROCEDURE WITHIN A
SAME SESSION OR A TIME LIMIT
*608*

*FIG. 6*

TECHNIQUES TO PRE-AUTHENTICATE A USER IDENTITY FOR AN ELECTRONIC ACCOUNT

RELATED APPLICATIONS

This application is a continuation of U.S. patent application Ser. No. 16/515,606, titled "TECHNIQUES TO PRE-AUTHENTICATE A USER IDENTITY FOR AN ELECTRONIC ACCOUNT" filed on Jul. 18, 2019. The contents of the aforementioned application are incorporated herein by reference in their entirety.

BACKGROUND

In modern times, people utilize several types of technology throughout the day. A laptop or desktop computer may be used to browse content provided by digital properties (e.g., web documents) on the Internet. A mobile smartphone, for instance, may be used to communicate (via text or voice) with others like a conventional mobile phone but may also be used to access a variety of digital properties (e.g., web documents as well as mobile and web applications) through which almost anything can be accomplished. Notably, each digital property may require the user undergo an authentication sequence to prove their identity. The user may be burdened with several different login credentials to keep track of in order to utilize these digital properties. Opening a new electronic account on one of these digital properties requires a new set of login credentials. Downloading a new application may open a new electronic account, necessitating the addition of a new login/password tuple.

The proliferation of such electronic accounts combined with the threat imposed by fraudsters has resulted in the need for more complicated authentication procedures (e.g., multi-factor authentication (MFA) sequences). Hence, for some digital properties, the user may have to track additional information just to successfully login. There are a number of difficulties and problems associated with managing the information necessary for using the technologies mentioned above, such as the mobile smartphone and the desktop computer. It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to pre-authenticate a user identity for an electronic account. Some embodiments are particularly directed to techniques to pre-authenticate an identity for an electronic account for modifying an authentication procedure to access the electronic account. In one embodiment, for example, an apparatus may include a processing circuit and logic stored in computer memory and executed on the processing circuit. The logic is operative to cause the processing circuit to monitor browser activity of a browser application and identify authentication events in the browser activity. The identified authentication events correspond to at least one third-party digital property. The logic is operative to cause the processing circuit to store information associated with the identified authentication events. The logic is operative to cause the processing circuit to communicate to an external system the information associated with the identified authentication events. The external system includes a first-party digital property. The logic is operative to cause the processing circuit to pre-authenticate, within a time limit or a same session as the monitored browser activity, an identity for an electronic account to the first-party digital property based upon the information associated with the identified authentication events. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of another logic flow for the system of FIG. 1.

DETAILED DESCRIPTION

Figure 1:
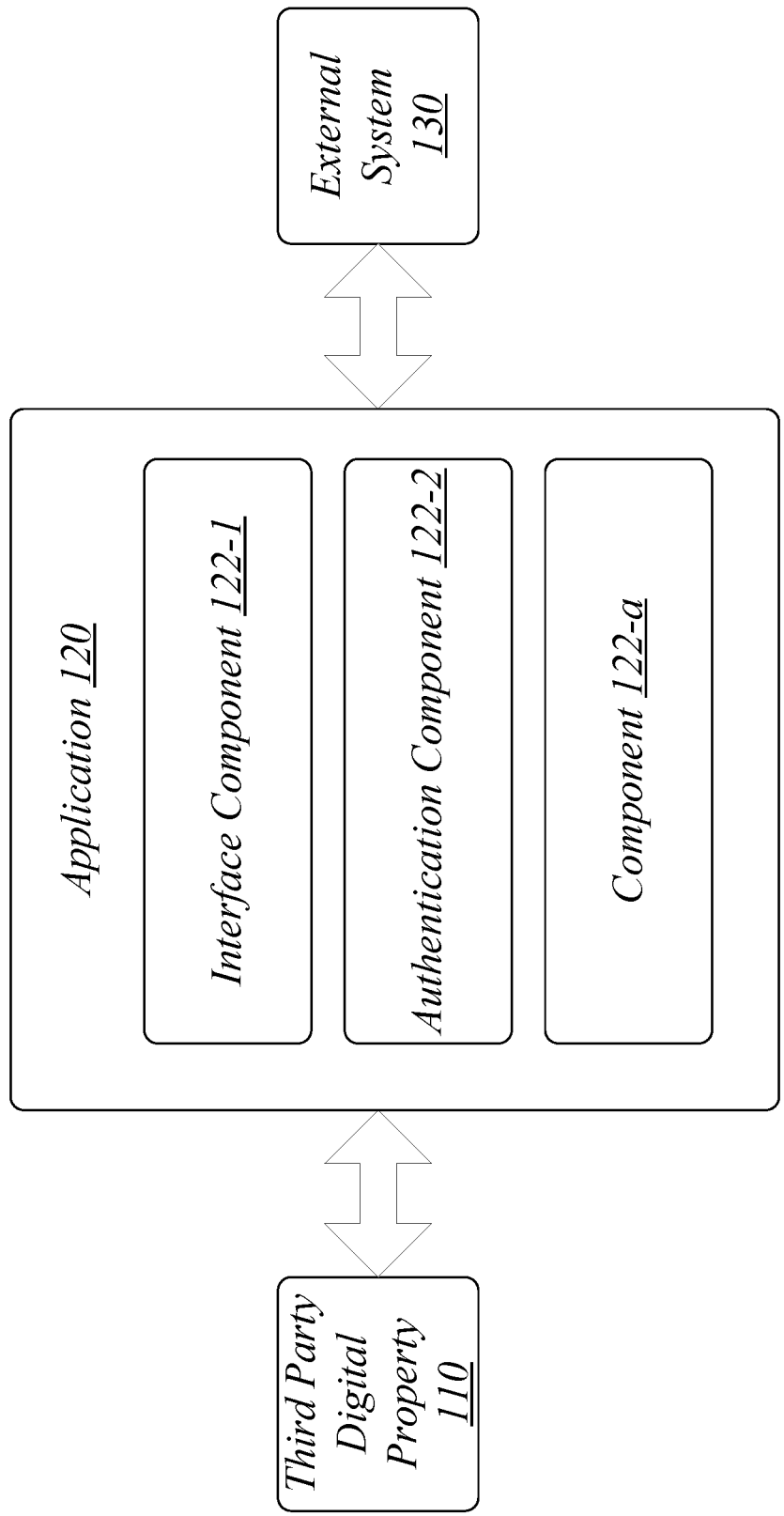
FIG. 1 illustrates an embodiment of a system to pre-authenticate an identity for an electronic account.

Various embodiments are directed to pre-authenticate a user identity for an electronic account. While some conventional systems may use one property's authentication information to be authenticated with another property, the present disclosure describes a system that utilizes a recent authentication with one property to pre-authenticate with the other property.

To illustrate by way of example, consider the following description. Successful completion of an authentication procedure with a social networking account confers (to a certain degree) an authenticity to a user's identity and their credentials. Depending on certain factors, the system may pre-authenticate the user identity to a bank account. The successful completion of the social network account's authentication procedure indicates possession of the proper credentials for the bank account. Even if the user has different credentials for the bank account, the system may determine that the same user successfully completed the social network account's authentication procedure. In some embodiments, upon determining that the banking account user also successfully completed the social networking account's authentication procedure, the system pre-authenticates the user identity for the bank account, for example, by bypassing a step in an authentication procedure for the bank account. As a result, the embodiments can improve affordability, scalability, modularity, extendibility, or interoperability for an operator, device or network.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components **122-*a*. Although the system 100 shown in FIG. 1 has a limited number of elements in a certain topology, it may be appreciated that the system 100** may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components **122-*a* may include components 122-1, 122-2, 122-3, 122-4 and 122-5**. The embodiments are not limited in this context.

In general, the system 100 includes the application 120 as a type of software application running on an electronic device, such as a desktop application running on an operating system of a computing device, a mobile application running on a mobile operating system of a mobile device, or a web application running on a browser application of either the mobile operating system or the desktop operating system. Those skilled in the art would understand how to design, build, and deploy the software application on any type of electronic device. In some embodiments, the application 120 is a browser application (i.e., a web browser) running on the operating system of either the computing device or the mobile device.

The application 120 may be generally arranged to process input of which some input may be provided directly to an interface component 122-1 via an input device, and other input may be provided to the interface component 122-1 via a network. For example, a user may enter data via a keyboard device attached to a computing device running the application 120. It is appreciated that the interface component 122-1 may provide Natural User Interface (NUI) capabilities, such as an ability to enter data and issue commands via speech, gesture, or both speech and gesture. The application 120 may be generally arranged to generate output for the interface component 122-1 of which some output may be configured for display on a display device and other output may be communicated across the network to other devices. As an example, the application 120 may generate data that can be processed/rendered by the interface component 122-1 into content for a Graphical User Interface (GUI).

The application 120 may be generally arranged to provide a device user or users with various services; among the provided services, the application 120 may provide the device user with Internet/World Wide Web (WWW) services. As described herein, the application 120 may be a browser application through which users may access data stored on devices (e.g., web servers) associated with the Internet. In general, the web servers on the Internet operative a plurality of digital properties on which content and other data may be viewed, added, or changed by device users, via the application 120 or another application.

A "digital property" as described in the present disclosure may refer to a web site presenting content in various forms. The web site may consist of a web documents (e.g., HTML and XML documents) and through an interface (e.g., a Document Object Model), the application 120 may access the web documents and process any associated data. The Document Object Model (DOM) is a cross-platform and language-independent application programming interface (API) that treats an HTML, XHTML, or XML web document as a logical tree structure wherein each branch of the tree ends in a node, and each node contains objects representing a part of the document. DOM methods allow programmatic access to the tree; with these methods, the web document's structure, style, or content can be accessed and/or changed. The DOM connects the web document to scripts or programming languages.

In some embodiments, a component of the application 120, via the interface, monitors browser activity and identifies the web documents. By "browser activity" the present disclosure refers to the web document file and any interaction with the web document where browser application is used. This would include any command or control directive caused by the user's use of an input device as well as any data entered by the user via the input device and submitted to an external system 130. Some data may include login information for accessing an electronic account on a digital property. In some embodiments, the "browser activity" may be confined to the web documents accessed during a single session (i.e., a browser session) and/or a time limit (e.g., five (5) minutes).

The external system 130 generally refers to a server or a server group configured to operate a first-party digital property. The browser application 120 establishes a connection with the external system 130. Through this connection, the user's device may access content (e.g., Rich Internet Content (RIC)) and other data corresponding to the first-party digital property. Because some of the content and other data may be sensitive/confidential, the external system 130 implements a security policy for the first-party digital property. Part of the security policy involves setting up an authentication procedure for the user to complete in order to gain access. One example authentication procedure known as multi-factor authentication (MFA), in general, refers to an authentication protocol in which the external system grants access only after the user, via the browser application, successfully presents two or more pieces of evidence to an authentication mechanism: knowledge, possession, and inherence. One evidential item is a credential data item (e.g., login information, biometric data input, hardware and software tokens, and/or the like) while another evidentiary item is a non-credential data item (e.g., confirmation code, answers to questions, and/or the like).

The application 120 includes the authentication component 122-2 that may be operative to pre-authenticate an identity for an electronic account on behalf of that user or group of users. By "pre-authenticate" and any equivalent term, the present disclosure refers to a process where the authentication component 122-2 generates some data (e.g., instructions) operative to modify an authentication procedure to the electronic account. The authentication component 122-2 may communicate such data by invoking a function on an application programming interface (API) that is implemented by the external system 130. An example function call is configured to cause the external system 130 to modify the authentication procedure; for instance, the external system 130 may respond to separate function calls from the electronic account's authentication page with authorization and then, an account page providing information about the electronic account. Such a function call may be a request for the external system 130 to consider; in another embodiment, such a function call may result in an automatic response by the external system 130. To extent the authentication component 122-2 controls the authentication procedure, the authentication component 122-2 exercises that control, for example, by modifying an authentication page associated with accessing the electronic account. The authentication component 122-2 may instruct a secure login object running on the authentication page to modify the authentication procedure. Various embodiments for modifying the authentication procedure are described herein.

The external system 130 may install the authentication component 122-2 as a software module in the application 120 (i.e., a browser extension); accordingly, the authentication component 122-2 resides in functionality of the application 120, as illustrated in FIG. 1. The authentication component 122-2, as an alternative, may be software module running outside of the application 120. An example account for pre-authentication, as described herein, may be an electronic account with the external system 130. By characterizing this digital property as being "first-party", the present disclosure is connecting the authentication component 122-2 to the external system 130. Hence, the authentication component 122-2 and the digital property_(e.g., web site) operated by the external system 130 have a first-party relationship whereby the authentication component 122-2 is involved (directly or indirectly) in authenticating the device user with the first-party digital property. In some embodiments, the authentication component 122-2 directly controls the execution of an authentication procedure for gaining access to the first-party digital property. In other embodiments, the authentication component 122-2 does not control the authentication procedure but is an agent of (or otherwise under the supervision of) the first-party digital property.

To illustrate by way of example, the authentication component 122-2 may be a web browser extension (i.e., a software program) that operates in cooperation with the application 120 (i.e., the web browser application) and, as described herein, monitors browser activity for authentication events corresponding to the third-party digital properties. Based upon these authentication events, the authentication component 122-2 determines whether to pre-authenticate an identity for the electronic account with the external system 130 associated with the first-party digital property. The authentication component 122-2 may be further configured to impose one or more limitations on such pre-authentication; example limitations may include a time limit and/or a same session requirement. The time limit may refer to a number of minutes to permit pre-authentication. The same session requirement may refer to permitting pre-authentication within a same browser session as a most recent identified authentication event.

Conversely, the authentication component 122-2 does not have any control over the authentication procedure with the third-party digital property 110; a separate mechanism may exist for executing such an authentication procedure. The authentication component 122-2, nonetheless, may access web documents as part of the browser activity and determine whether there was a successful completion of the authentication procedure for accessing the third-party digital property 110.

There are a number of embodiments in which the authentication component 122-2 recognizes the successful completion of the authentication procedure. In some embodiments, the authentication component 122-2 uses the DOM to determine that a web document of current browser activity is requesting login information, for example, by having a GUI element for the user to enter their login information. The current web document may be a login or authentication page for an email account. After waiting a pre-defined time period, the authentication component 122-2 determines whether a recent web document is one that is only accessible after entering correct login information to the above-mentioned web document, thereby successfully completing the authentication procedure to the email account. The recent web document may be the email account's account page depicting personal account information as well as a list of emails. Through the DOM, the authentication component 122-2 can identify this and other indicia of a successful login when confirming that the user successfully completed the authentication procedure.

Various software components for the third-party digital property may operate to invoke a request for the user's login information via a web document and those software components may reside within the web document, a server, or both the web document and a server. In some embodiments, the authentication component 122-2 identifies packets or other communications directed to a server running a directory service (e.g., Active Directory service, such as Active Directory Domain Services (AD DS) or Active Directory Lightweight Directory Services (AD LDS)). In some embodiments, the authentication component 122-2 identifies packets or other communications directed to a server operating an identity provider for a web service like GOOGLE® Docs™ or SALESFORCE® cloud apps. In other embodiments, the authentication component 122-2 identifies, in a web document, software code (e.g., Simple Object Access Protocol (SOAP), Perl, or JavaScript) operating the authentication procedure (to provide a secure login) to the external system 130. It is further appreciated that those of ordinary skill may apply the authentication component 122-2 to recognize successful completion of alternative authentication procedure implementations.

In some embodiments, the system 100 provides the authentication component 122-2 as a mechanism to bypass at least a portion of the authentication procedure implemented for accessing the external system 130 and the first-party digital property. The user's data does not have to satisfy an entirety of the authentication procedure because other authentication events confer at least a modicum of authenticity to the user's identity. These other authentication events may correspond to the third-party digital property 110. To illustrate by way of example, if the user successfully completed an authentication protocol for logging into and accessing their social media account, that authentication event implies that the user's identity at least matches the social media account.

The authentication component 122-2 recognizes the user's successful login and compares information corresponding to such an authentication event with information (e.g., login information) associated with the authentication procedure for the first-party digital property. An account with the first-party digital property and the social media account may share some information including at least one credential used for logging into and accessing the social media account, such as an email account. Because the same email account used to gain access to the social media account could also be used for the account with the first-party digital property, there is ample evidence for pre-authentication and allowing the user to bypass at least a portion of the authentication procedure associated with the first-party digital property.

In addition to the social media account, the authentication component 122-2 recognizes indicia corresponding to an authentication event with economic and commercial third-party digital properties, such as a workplace account, an online shopping/commercial account or a financial institution. In some embodiments, the authentication component 122-2 identifies a financial institution in information associated with the above-mentioned indicia and then, compares that information with information (e.g., login information) associated with the authentication procedure for the first-party digital property. It is appreciated that an account with the first-party digital property and an account with the financial institution may share some information and that information includes knowledge-based data items and non-knowledge-based data items. As an example, the financial institution and the first-party digital property may require that the user provide correct answers to a same question.

As another example, the financial institution and the first-party digital property may require that the user provide a particular phone number to proceed in their respective authentication procedures. The present disclosure does not place any limitation on the ways the user's phone number can be used for authentication to the financial institution. At a minimum, the user's phone number operates as a credential. A mobile phone associated with the user's phone number may place a role in satisfying the authentication procedure for the first-party digital property. A SMS message with a confirmation number may be transmitted to a mobile phone; the user must enter that confirmation number to successfully login and access the first-party digital property. The mobile phone may receive an automated phone call requesting the user provide some identifying information. Instead of the user's phone number, the financial institution may use the user's email address to communicate the confirmation number.

As an alternative, the first-party digital property and the third-party digital property (e.g., the social media account) may be connected to each other via a common application. There may a common user interface (UI) for presenting information related to both the first-party digital property and the social media account; for at least that reason, the authentication component 122-2 bypasses at least a portion of the authentication procedure associated with the first-party digital property. In another alternative embodiment, the first-party digital property and the third-party digital property are accounts with different financial institutions whose information may be combined into a single view for users to visualize transactions from both accounts. The authentication component 122-2 may access the single view and determine that access has been granted by the third-party digital property. The connection between these accounts (as provided by the single view) gives authority to the authentication component 122-2 for bypassing at least a portion of the authentication procedure associated with the first-party digital property.

Bypassing any portion of the authentication procedure is progress towards accessing the electronic account associated with the first-party digital property. In one embodiment, the authentication component 122-2 instructs the external system 130 (via an API function call) to skip a requirement for a credential data item (i.e., login information) or a requirement for a non-credential data item. The external system 130, in response, may update an authentication page being processed by the application 120 such that the updated authentication page depicts progress in the authentication procedure. As an alternative, the application 120 may replace the initial authentication page with a modified authentication page depicting an altered authentication procedure, such as one with an omitted step.

The authentication component 122-2 may establish a time limit within which pre-authentication is to be executed (if at all). The time limit starts tolling with the successful login to the social media account and if the time limit elapses, the authentication component 122-2 is prevented from pre-authenticating the user's identify for the first-party digital property. In one embodiment, the authentication component 122-2 cannot instruct the external system 130 and/or the application 120 to bypass any step in the authentication procedure for the first-party digital property. The external system 130 may ignore API function calls requesting pre-authentication from the authentication component 122-2.

The authentication component 122-2 may establish a requirement that pre-authentication occurs within a same session as the above-mentioned identified authentication event, such as the successful login to the social media account or another financial account. Similar to the time limit requirement, the authentication component 122-2 cannot instruct the external system 130 and/or the application 120 to bypass any step in the authentication procedure for the first-party digital property when it is determined that the social media account or the other financial account are being accesses in the same session (e.g., browsing session). The external system 130 may ignore API function calls requesting pre-authentication from the authentication component 122-2 if such function calls do not arrive within the same session as the successful login to the social media account or the other financial account.

The authentication component 122-2 may permit pre-authentication

Figure 2:
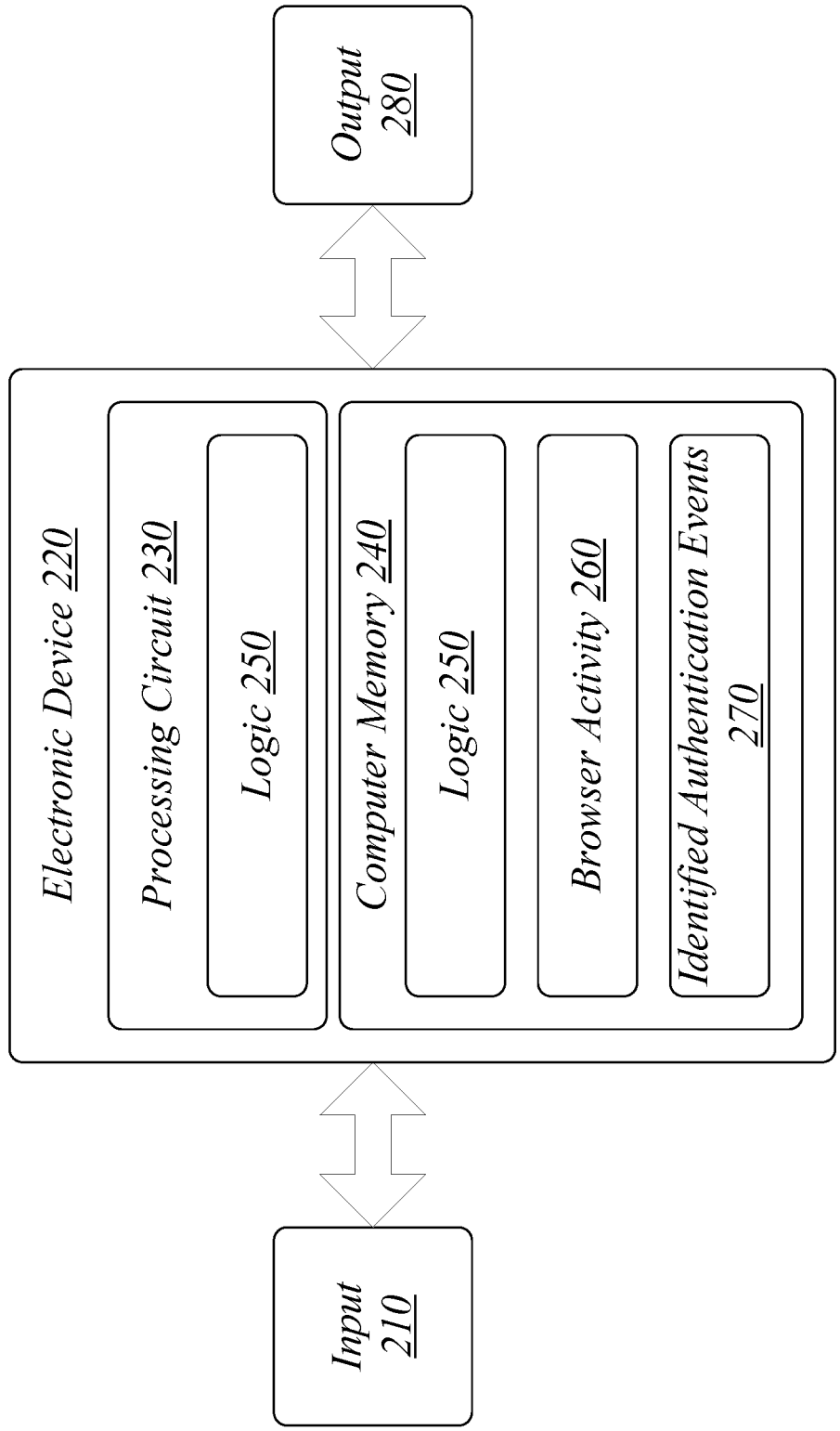
FIG. 2 illustrates an embodiment of an apparatus to implement the system of FIG. 1.

FIG. 2 illustrates an embodiment of an apparatus 200 for the system 100. As shown in FIG. 2, the apparatus 200 includes an electronic device 220 having a processing circuit 230 and computer memory 240. In general, the apparatus 220 is configured to process input 210 (e.g., from an input device, such as a keyboard or a camera) and communicate output 280 (e.g., for an output device, such as a display or a network).

The apparatus 220 further includes logic 250 stored in the computer memory 240 and executed on the processing circuit 230. The logic 250 may be installed into the browser application as a program having executable instructions/software code (i.e., a browser extension). The present disclosure provides the logic 250 as a mechanism for pre-authentication through which some aspect of an authentication procedure is managed or handled in some respect for users of the apparatus 200. It is appreciated that there may be several embodiments for automating or bypassing a step in the authentication procedure and the logic 250 is envisioned to cover some, if not all, of these embodiments.

The logic 250 is operative to cause the processing circuit 230 to monitor browser activity 260 of a browser application and identify authentication events 270 in the browser activity 260. As described herein, the browser application (e.g., the application 120 of FIG. 1) may include the logic 250 as an extension program with access, via a Document Object Model (DOM), to web documents. Device users browsing the Internet may view Internet content rendered by the browser application via web document processing. While these devices users browse the Internet, the browser application processes and then, stores the web documents in a location accessible by the logic 250 (i.e., the browser activity 260).

Depending upon which control rights are afforded to the logic 250, the apparatus 200 stores various information corresponding to the identified authentication events 270. In one embodiment, the logic 250 may examine the identified authentication events 270 for authentication pages such as those running authentication procedure scripts. In another embodiment, having access to recorded login details corresponding to the identified authentication events 270, the logic 250 may be configured to compare login information used at different digital properties. In this manner, the logic 250 may determine that a same user name or password is being used at multiple digital properties.

Some of the identified authentication events 270 correspond to one or more third-party digital properties. As described herein, the third-party digital property refers to any web site whose authentication is not under the control of the logic 250. The logic 250 is further operative to cause the processing circuit 230 to store information associated with the identified authentication events 270. In some embodiments, the logic 250 may operate on the web documents with certain URLs such as those known to use a secure login or another authentication procedure. In other embodiments, the logic 250 may recognize GUI elements operating a secure login, such as a JavaScript object requesting a username (e.g., an email address) and a password. Those of ordinary skill would be able to configure the logic 250 to identify any type of authentication procedure being implemented for the browser application. Successful completion of an authentication procedure constitutes an authentication event.

The logic 250 is further operative to cause the processing circuit 230 to communicate to an external system (e.g., the external system 130 of FIG. 1) the information associated with the identified authentication events 270. The external system may operate a computer-networked environment to serve content (e.g., Rich Internet Content (RIC)) for a first-party digital property to client devices. As described herein, the external system provides a web document to operate an authentication procedure for accessing such content. Some embodiments configure the logic 250 to operate as an agent for the external system, having some authority over at least some aspect of the authorization procedure with the external system.

The logic 250 may be configured to identify an authentication page, such as an authentication page corresponding to the at least one third-party digital property, from the browser activity 260. In some embodiments, the logic 250 is operative to cause the processing circuit to identify an authentication page when that page is being accessed by the browser application or based upon historical data. It is appreciated that the logic 250 may be specific to at least one third-party digital property or generic such that the logic 250 may be universally applied across any number of digital properties.

The logic 250 can access, via an interface (e.g., an Application Programming Interface (API)), any file/content type compatible with the browser application. In some embodiments, the logic 250, via the DOM, may view a web document's structure and inspect any data as well as state information associated with the web document. Via the interface, the logic 250 may determine whether a current web document is an authentication page, for example, by identifying various indicia associated with authentication procedures. This may include identifying scripted code requesting login information as input.

The logic 250 may be configured to identify a multi-factor authentication sequence, such as a multi-factor authentication sequence corresponding to the at least one third-party digital property. Multi-factor authentication, in general, refers to an authentication method in which the external system grants access only after the user, via the browser application, provides two or more authentic data items. At least one data item is a set of credentials (e.g., a login/user name and password) associated with an account with a digital property. Other data items include answers to favorite questions, confirmation codes, and/or the like. The user provides correct data items and the external system authenticates the data items. In some embodiments, the logic 250 is operative to cause the processing circuit to identify the multi-factor authentication (MFA) sequence that initiates from an authentication page. Alternatively, the logic 250 may be operative to identify the MFA without or independent of the authentication page.

The logic 250 is further operative to cause the processing circuit 230 to pre-authenticate an identity for an electronic account to the first-party digital property corresponding to the external system using the information associated with the identified authentication events. When the logic 250 identifies an authentication event, such as the successfully completion of the MFA for the at least one third-party digital property, the logic 250 determines whether the identified authentication event has any information corresponding to an account associated with the first-party digital property. In some embodiments, the logic 250 determines that matching login information was used for the identified authentication event and the account associated with the first-party digital property. If the logic 250 determines that the same credentials used for the above-mentioned MFA also belong to the electronic account with the first-party digital property, the logic 250 may pre-authenticate the user identity for the first-party digital property. As one reason, the successful completion of the MFA strongly indicates that the user is an authorized account holder with the first-party digital property. In other embodiments, an authentication event including a successful MFA may be a feature in a feature set used for determining whether to pre-authenticate the user with the account for the digital property.

The logic 250 may utilize a variety of techniques to pre-authenticate the user. In some embodiments, the logic 250 may automate the authentication procedure in its entirety or a portion thereof. In some embodiments, the logic 250 may authorize the user to bypass a step in the authentication procedure for the electronic account of the digital property. In other embodiments, the logic 250 may pre-populate an authentication page for the same electronic account with some of the data items used in the identified authentication events 270.

The external system may provide control directives instructing the logic 250 on the data items to use. When the user requests access to the electronic account, the logic 250 (recognizing that request) may provide the external system with the information associated with the identified authentication events 270; in turn, the external system may eliminate a requirement to produce one or more non-credential data items, such as answers to favorite questions, confirmation codes, and/or the like. The external system may provide the logic 250 with instructions on bypassing this requirement when presented in a web document. Alternatively, the external system may provide the logic 250 with instructions on bypassing a requirement for a credential data item.

To illustrate pre-authentication by way of example, the user may access a web document having a JavaScript object operating an MFA and, via the logic 250, bypass one or more steps in the MFA. Assuming that the identified authentication events 270 indicate the identity of the user, the logic 250 may instruct the external system to bypass the requirement for a non-credential data item and then, update the JavaScript object accordingly. The logic 250 may provide the JavaScript object with a correct data item to satisfy the requirement. The external system may provide the logic 250 with the correct data item or, as an alternative, that correct data item may have been stored when the user previously completed the MFA. The logic 250, as an alternative, may provide the JavaScript object with a code (e.g., a mathematical sequence) signifying authorization to omit the requirement for non-credential data items. In yet another alternative embodiment, the external system may provide an account page for the pre-authenticated electronic account and the logic 250 may instruct the browser application to replace the web document with that account page.

Figure 3:
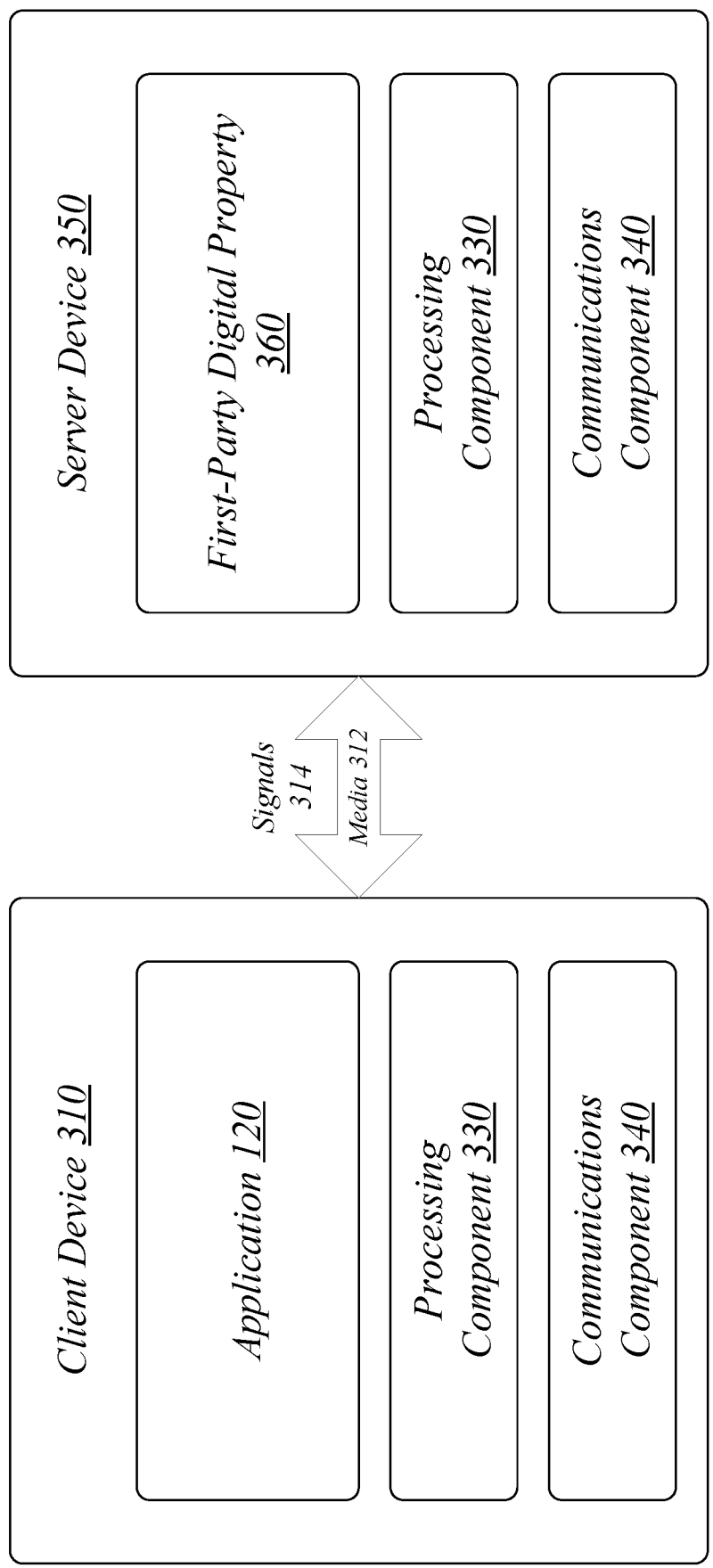
FIG. 3 illustrates an embodiment of a distributed model for the system of FIG. 1.

FIG. 3 illustrates a block diagram of a distributed model 300 of the system 100 of FIG. 1. The distributed model 300 may distribute portions of the structure and/or operations for the system 100 across multiple computing entities. Examples of distributed model 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context. The system 100, as an alternative, may implement some or all of its structure and/or operations in a single computing entity or electronic device.

The distributed model 300 may comprise a client device 310 and a server device 350. In general, the client device 310 and the server device 350 may be the same or similar to the apparatus 200 as described with reference to FIG. 2. For instance, the client system 310 and the server system 350 may each comprise a processing component 330 which are the same or similar to the processing component 230 as described with reference to FIG. 2. In another example, the devices 310, 350 may communicate over a communications media 312 using communications signals 314 via the communications components 340.

Each of the devices 310, 350 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

Each of the devices 310, 350 may execute processing operations or logic for the system 100 using the processing component 330. The processing component 330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Each of the devices 310, 350 may execute communications operations or logic for the system 100 using the communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client device 310 may comprise or employ one or more client programs that operate to perform various methodologies in accordance with the described embodiments. The server device 350 may comprise or employ one or more server programs that operate to perform various methodologies in accordance with the described embodiments. In one embodiment, for example, the client device 310 may implement the application 120, which may be a browser application (i.e., a web browser), and the server device 350 may implement a first-party digital property. As described herein, the server device 350 may operate as a web server for content associated with the first-party digital property. The application 120, on behalf of a device user, may request some content from the server device 350 by communicating data from the client device 310. Then, the application may, after receiving the requested content, process and view that content on a display (e.g., a monitor) of the client device 310.

As described herein, the application 120 includes logic in the form of an executed software program running in the client device 310. The logic is configured with authority over some aspect of an authentication procedure with the first-party digital property 360. Hence, that logic monitors browser activity of the application 120 while operating as an authentication component for the client device 310 on behalf of the first-party digital property 360. One purpose of such monitoring is to identify authentication events with other digital properties. In some embodiments, the above-mentioned logic pre-authenticates an identity for an electronic account with the first-party digital property 360 after identifying matching login information between the first-party digital property 360 and the other digital properties.

Figure 4:
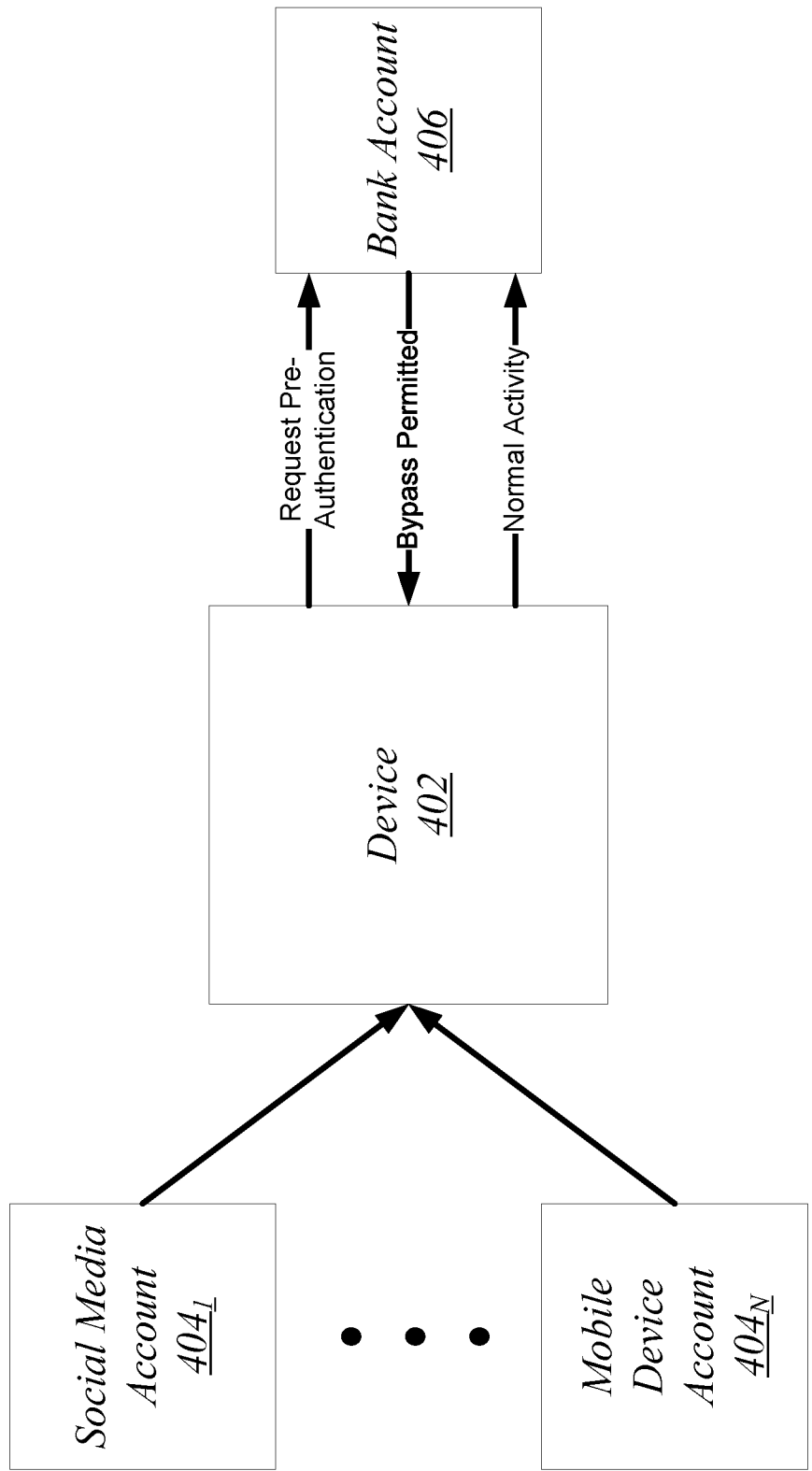
FIG. 4 illustrates an embodiment of an operational environment for the system of FIG. 1.

FIG. 4 illustrates an embodiment of an operational environment 400 for the system 100. As shown in FIG. 4, a plurality of third-party digital properties are accessible from a type of electronic device herein referred to as a device 402.

These third-party digital properties, depicted in FIG. 4 as including a social media account $404_1$ and an Internet Service Provider (ISP) account $404_N$, implement various authentication procedures for the device 402 user to satisfy. It is appreciated that a number of other third-party digital properties are envisioned by the present disclosure for the operational environment 400. In view of the present disclosure, one may apply the operational environment 400 to a third-party digital property other than the social media account $404_1$ or the ISP account $404_N$. In accordance with some embodiments being described in the present disclosure, the device 402 has installed in a browser application an extension program configured to pre-authenticate the user in response to successful completion of the above-mentioned authentication procedures.

After satisfying the above-mentioned authentication procedures, there may be enough evidence to pre-authenticate an identity of the device 402 user for a bank account 406. By nature, the bank account 406 requires more security than any of the plurality of third-party digital properties depicted in FIG. 4. For this reason, the bank account 406 may implement an MFA protocol comprising a series of steps for the mobile device 402 user to satisfy. However, if sufficient evidence exists for the identity of the device 402 user, the mobile device 402 may request pre-authentication along with a request for access to the bank account 406. Before presenting a first step of the MFA, an external system securing the bank account 406 may analyze the request for pre-authentication. The external system securing the bank account 406 may examine evidentiary information associated with previous authentication events, such as those where a satisfactory completion of an authentication procedure involved matching login information.

If, for instance, a same user name (e.g., email address) is used for the social media account $404_1$ (or the ISP account $404_N$) and the bank account 406, the external system operating the bank account 406 may modify the MFA to skip a requirement for a non-credential data item. The external system operating the bank account 406 may modify a GUI element (e.g., a JavaScript object) to present only the first step of the MFA, bypassing any subsequent step, accordingly to one embodiment. In this manner, the bank account 406 still authorizes the user after successfully providing correct credential data items (e.g., the user name and password). As another example, if a same phone number used for completing the first step of the MFA also is required by the ISP account $404_N$, the external system operating the bank account 406 may modify the MFA to proceed to a second or next requirement.

Successfully gaining access to the social media account $404_1$ using a same set of credentials at least implies some authenticity on the identity of the device 402 user. If, for instance, the same user name (e.g., email address) and password is used for accessing the social media account $404_1$ and the bank account 406, the external system operating the bank account may skip the first step of the MFA since the identity of the device 402 user has been verified to a degree. In this manner, the external system operating the bank account 406 may proceed to one or more subsequent steps requesting one or more non-credential data items.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
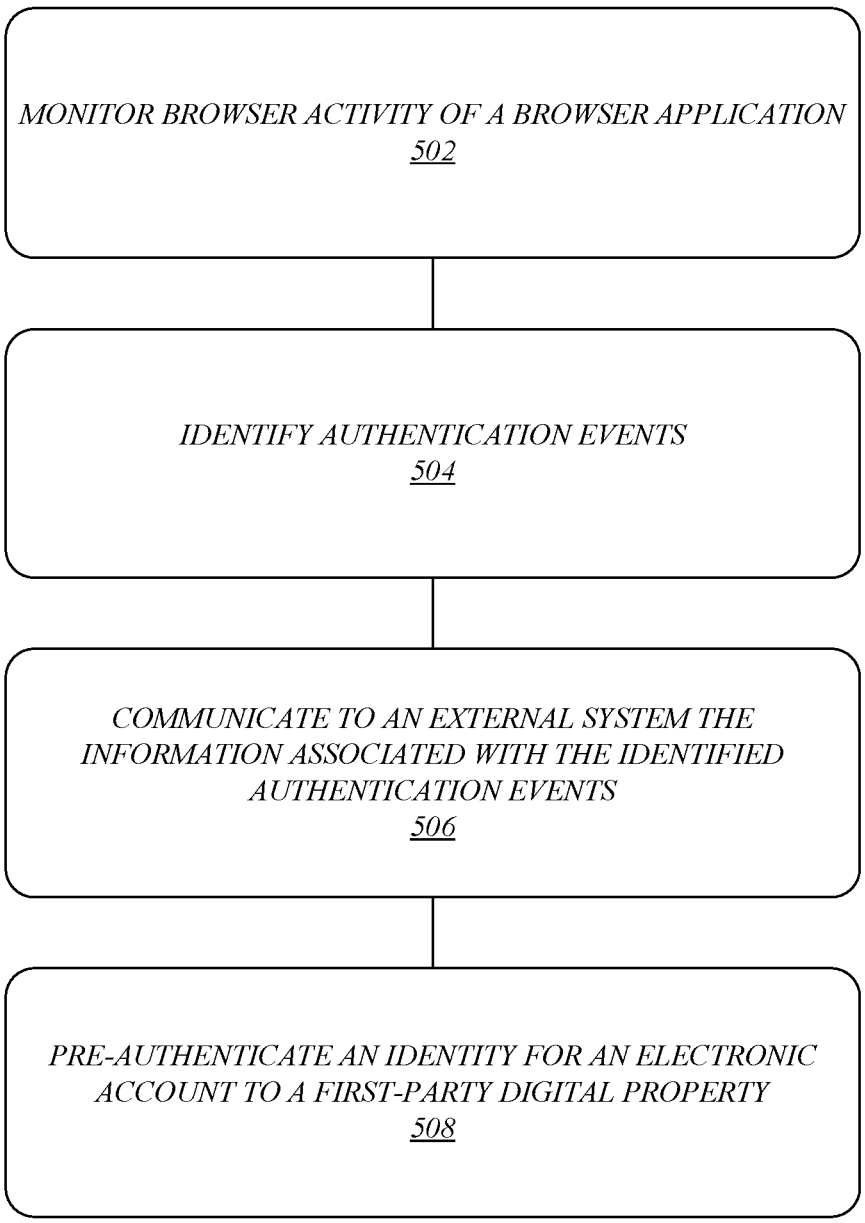
FIG. 5 illustrates an embodiment of a logic flow for the system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 monitors browser activity of a browser application at block 502. For example, the logic flow 500 may be performed by a browser application component (i.e., a browser extension herein referred to as an authentication component). The logic flow 500 may process web documents by examining each document's content and structure as well as any metadata. A web document that also is an authentication page may include a GUI element having a secure login with form fields into which a user enters login information, such as a user name and a password. The GUI element may be a type of a dynamic object generated by executed code (e.g., JavaScript code).

The logic flow 500 may identify authentication events at block 504. For example, these authentication events may correspond to a successful completion of an authentication procedure for accessing web documents of a third-party digital property, such as a social media account or a mobile device account. The logic flow 500 may identify instances of the above-mentioned authentication page where the dynamic object runs an authentication procedure. If the logic flow 500 recognizes an account page following the authentication page, there has been a successful completion of the authentication procedure and an authentication event. The logic flow 500 may store information associated with the authentication event. It is appreciated that the logic flow 500 may utilize alternate ways to identify the authentication events. Another characteristic of an authentication procedure may be the presence of a secure protocol (e.g., HTTPS) in the web document. Yet another characteristic of an authentication procedure may be the presence of a particular programming language (e.g., SAML) in the web document.

The logic flow 500 may communicate to an external system the information associated with the identified authentication events at block 506. The logic flow 500 may pre-authenticate an identity for an electronic account to a first-party digital property using the information associated with the identified authentication events at block 508. As described herein, the external system operates a web server for the first-party digital property and provides access to content from that digital property. For example, the external system (e.g., the external system 130 of FIG. 1) may be a computer-networked environment that manages electronic accounts (e.g., the bank account 406 of FIG. 4) for a financial institution. To secure these electronic accounts while providing a user with access to their account, the external system may implement an authentication procedure involving multiple steps.

An example authentication procedure may commence with presentation of an authentication page and a dynamic object requesting login information. In cooperation with the browser application component running on a client device, the external system processes the information associated with the identified authentication events. In some embodiments, the logic flow 500 identifies matching login information being used by the first-party digital property and one of the third-party digital properties and for at least that reason, instructs the external system to modify the authentication procedure. The logic flow 500, as the browser application component, initiates an API function call to the external system, causing the external system to update the authenticate page. In another embodiment, the external system identifies matching login information being used at both the first-party digital property and the third-party digital property and updates the authentication page accordingly.

As a result of the updated authentication page, the logic flow 500 may bypass one of the multiple steps in the authentication procedure. In one embodiment, the external system provides a modified dynamic object that requests login information (i.e., a credential data item) but omits requesting additional evidentiary information. In another embodiment, the browser application component provides a code to the dynamic object to bypass a step requesting a non-credential data item. If the browser application component is configured with additional control rights, the browser application component may insert (scripted) code into the authentication page that bypasses one of the multiple steps. The embodiments are not limited to this example.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 processes a web document and identifies a portion corresponding to a secure login protocol or another authentication procedure at block 602. For example, the logic flow 600 may be implemented as a browser extension and configured to identify an authentication page having a GUI element requesting login information and other evidential information. A user browsing the Internet with a web browser may request the authentication page to access a first-party digital property. The authentication page may include a dynamic object operative to generate the GUI element and communicate with an external system to confirm an identity.

The logic flow 600 may identify a successful login with a white-listed digital property at block 604. It is appreciated that the browser extension and/or the first-party digital property may implement a white-list including acceptable digital properties for pre-authentication. As described herein, the logic flow 600 may search information associated with previous authentication events and identify a successful completion of a type of authentication procedure in use by the white-listed digital property. That information may be useful in pre-authenticating an identify of the user for the first-party digital property. The white-list, in general, includes resource locators (e.g., URLs) of websites known to be reputable (e.g., financial institutions such as banks), and a successful completion of an authentication procedure into one of these websites implies an identity for the user.

The logic flow 600 may process information associated with the first-party digital property at block 606. For example, the logic flow 600 may recognize an authentication page (i.e., a web document) for an electronic account associated with the first-party digital property. The logic flow 600 may compare login information associated with the first-party digital property and identify matching login information between the first-party digital property and the white-listed digital property. As an alternative, the external system managing the first-party digital property may inform the browser extension of matching login information between the first-party digital property and the white-listed digital property; in turn, the logic flow 600, operating as the browser extension, instructs the external system to update the authentication page with an account page for the requested electronic account.

The logic flow 600 may issue a control directive to omit a portion of a multi-factor authentication procedure within a same session and/or a time limit at block 608. Because of at least the matching login information, the first-party digital property has sufficient proof of the user identity to bypass at least a portion of the multi-factor authentication procedure. The control directive may include a function call communicated to the external system's API. In addition or as an alternative, the control directive may include one or instructions to cause the web browser processing the above-mentioned authentication page to modify the secure login protocol. The logic flow 600 may cause the secure login protocol to skip a requirement for a non-credential data item. The logic flow 600 may also provide correct login information or other credentials and update the authentication page being viewed in the web browser. The same session refers to the same browsing session as the monitored browser activity. The embodiments are not limited to this example.

Figure 7:
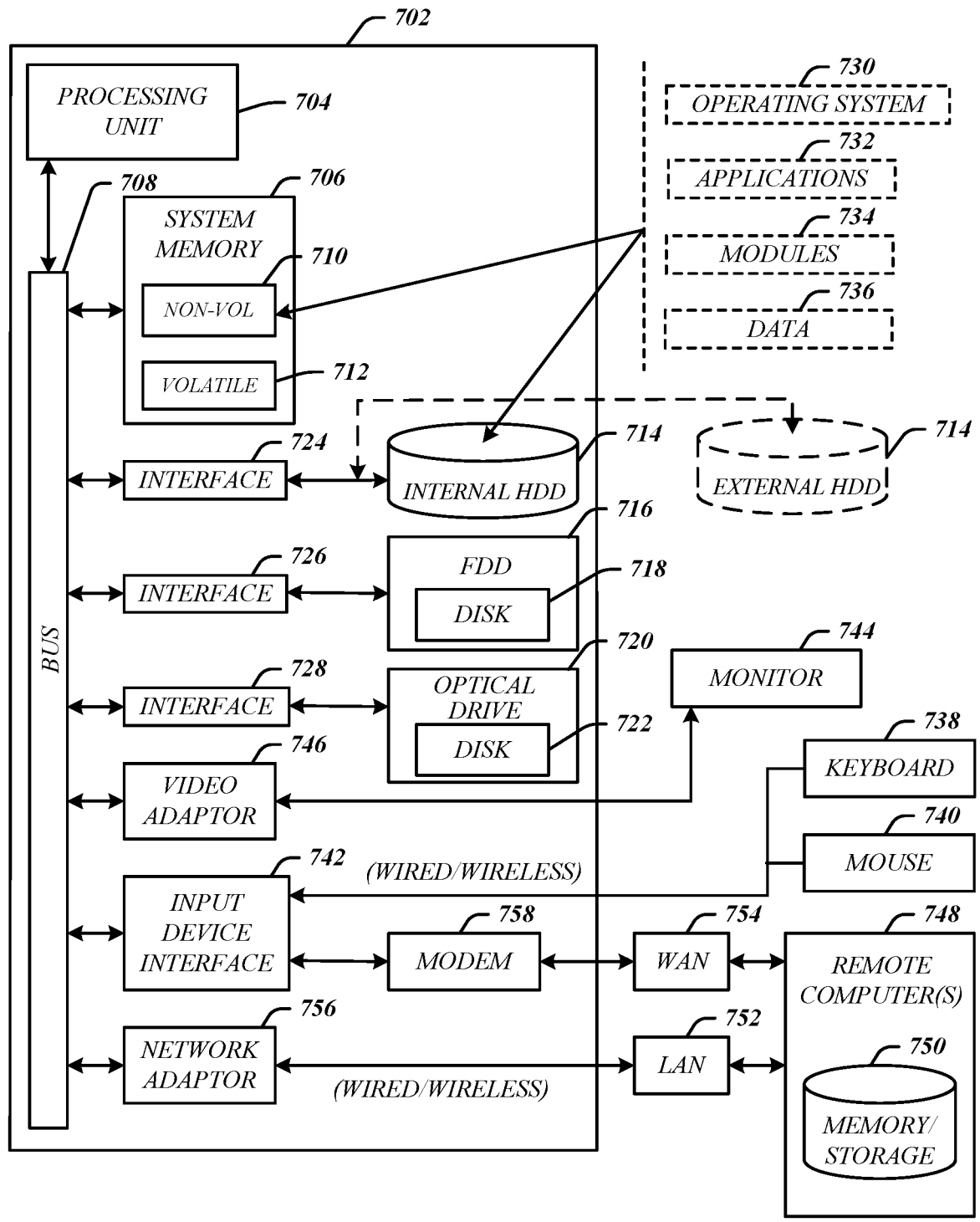
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
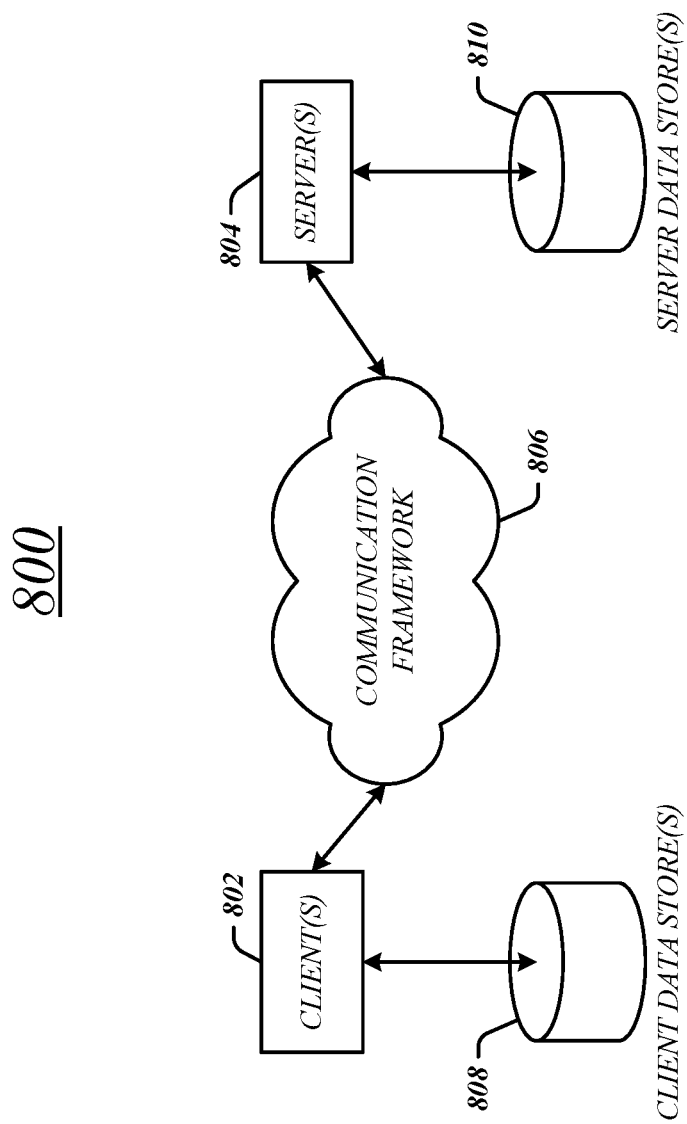
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 910. The servers 804 may implement the server device 950. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client device 310 and the server device 350. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
a processing circuit; and
logic stored in computer memory and executed on the processing circuit, the logic operative to cause the processing circuit to:
monitor browser activity of a browser application and identify authentication events in the browser activity, the authentication events corresponding to at least one third-party digital property, the authentication events comprising authentication information provided to access the at least one third-party digital property;
communicate to an external system the authentication information associated with the identified authentication events, the external system comprising a first-party digital property;
identify a request to access an account associated with the first-party digital property; and
bypass a step in a multi-factor authentication sequence for the account to the first-party digital property based upon at least a piece of the authentication information for the third-party digital property matching information to satisfy at least one factor of the multi-factor authentication sequence for the first-party digital property.

2. The apparatus of claim 1 comprising logic operative to cause the processing circuit to:
communicate the request to access the account to the external system comprising the first-party digital property; and
receive an indication to bypass the external system based on the information associated with the identified authentication events.

3. The apparatus of claim 1, wherein the processing circuit to bypass the step comprises communicating an instruction to the external system to skip a requirement for a credential data item.

4. The apparatus of claim 1, wherein the processing circuit to bypass the step comprises communicating an instruction to the external system to skip a requirement for a non-credential data item.

5. The apparatus of claim 1, wherein the processing circuit to bypass the step comprises prepopulating an authentication page associated with the first-party digital property.

6. The apparatus of claim 5, wherein the processing circuit to prepopulate the authentication webpage with at least some of the information associated with the identified authentication events.

7. The apparatus of claim 1 comprising logic operative to cause the processing circuit to establish a time limit to by the step of the multi-authentication sequence for the account.

8. A computer-implemented method, comprising:
monitoring browser activity of a browser application and identify authentication events in the browser activity, the identified authentication events corresponding to at least one third-party digital property, the authentication events comprising authentication information determined to provide access to the at least one third-party digital property;
communicating to an external system information associated with the identified authentication events, the external system comprising a first-party digital property;
identifying a request to access an account associated with the first-party digital property; and bypassing a step in a multi-factor authentication sequence for the account to the first-party digital property based upon at least a portion of the authentication information for the third-party digital property matching information to satisfy an authentication sequence for the first-party digital property.

9. The computer-implemented method of claim 8, comprising:
communicating the request to access the account to the external system comprising the first-party digital property; and
receiving an indication to bypass the external system based on the information associated with the identified authentication events.

10. The computer-implemented method of claim 8, comprising bypassing the step comprises communicating an instruction to the external system to skip a requirement for a credential data item.

11. The computer-implemented method of claim 8, comprising bypassing the step comprises communicating an instruction to the external system to skip a requirement for a non-credential data item.

12. The computer-implemented method of claim 8, comprising bypassing the step comprises prepopulating an authentication page associated with the first-party digital property.

13. The computer-implemented method of claim 12, comprising prepopulating the authentication webpage with at least some of the information associated with the identified authentication events.

14. The computer-implemented method of claim 8, comprising establishing a time limit to by the step of the multi-authentication sequence for the account.

15. A non-transitory computer-readable medium comprising instructions, that when executed by processing circuitry, cause the processing circuitry to:
monitor browser activity of a browser application and identify authentication events in the browser activity, the authentication events comprising authentication information provided to access at least one third-party digital property;
communicate to an external system information associated with the authentication events, the external system comprising a first-party digital property;
identify a request to access an account associated with the first-party digital property; and
bypass a step in a multi-factor authentication sequence for the account to the first-party digital property based upon the authentication information associated with the identified authentication events matching authentication information to access the first-party digital property.

16. The non-transitory computer-readable medium of claim 15, wherein the processor circuit to:
communicate the request to access the account to the external system comprising the first-party digital property; and
receive an indication to bypass the external system based on the information associated with the identified authentication events.

17. The non-transitory computer-readable medium of claim 15, wherein the processor circuit to bypass the step comprises communicating an instruction to the external system to skip a requirement for a credential data item.

* * * * *